United States Patent
Borrel et al.

(10) Patent No.: US 11,104,975 B2
(45) Date of Patent: Aug. 31, 2021

(54) METHOD FOR REDUCING NITROGEN OXIDES IN STRIP TREATMENT FURNACES

(71) Applicant: ANDRITZ Technology and Asset Management GmbH, Graz (AT)

(72) Inventors: Pierre-Jerome Borrel, Montreuil (FR); Eric Blake, Sewickley, PA (US)

(73) Assignee: Andritz Technology and Asset Management GmbH, Graz (AT)

(*) Notice: Subject to any disclaimer, the term of this patent is extended or adjusted under 35 U.S.C. 154(b) by 0 days.

(21) Appl. No.: 16/630,533

(22) PCT Filed: May 29, 2018

(86) PCT No.: PCT/EP2018/064058
§ 371 (c)(1),
(2) Date: Jan. 13, 2020

(87) PCT Pub. No.: WO2019/011517
PCT Pub. Date: Jan. 17, 2019

(65) Prior Publication Data
US 2021/0079494 A1    Mar. 18, 2021

(30) Foreign Application Priority Data
Jul. 13, 2017 (AT) ............... A 50583/2017

(51) Int. Cl.
*C21D 9/573*   (2006.01)
*C21D 9/56*    (2006.01)
(Continued)

(52) U.S. Cl.
CPC ............. *C21D 9/561* (2013.01); *B01D 53/56* (2013.01); *B01D 53/76* (2013.01); *C21D 9/5735* (2013.01);
(Continued)

(58) Field of Classification Search
CPC .......... C21D 9/56; C21D 9/573; C21D 9/561; C21D 2241/00; C21D 2281/00;
(Continued)

(56) References Cited

U.S. PATENT DOCUMENTS 3,081,074 A * 3/1963 Blackman ................ C21D 9/54
                                                              432/260
7,004,753 B2   2/2006 Stockhausen
(Continued)

FOREIGN PATENT DOCUMENTS

CN   1 059 707 C  * 12/2000 ............. C21B 13/14
CN   107206313 B  *  9/2020 ............. B01D 53/56
(Continued)

OTHER PUBLICATIONS

International Search Report dated Jul. 6, 2018 (PCT/EP2018/064058).

*Primary Examiner* — Timothy C Vanoy
(74) *Attorney, Agent, or Firm* — Alix, Yale & Ristas, LLP

(57) ABSTRACT

The invention relates to a method for treating metal strip in a directly fired furnace through which the metal strip is guided. The furnace is fired directly by gas burners and has a non-fired zone through which the exhaust gases from the fired zone flow and thus heat the metal strip. After leaving the non-fired zone, the exhaust gases from the furnace undergo post-combustion in an afterburner chamber. According to the invention, methane is injected into the non-fired zone, which causes nitrogen oxides contained in the waste gas to be converted into hydrogen cyanide.

19 Claims, 1 Drawing Sheet

(51) Int. Cl.
*B01D 53/56* (2006.01)
*B01D 53/76* (2006.01)

(52) U.S. Cl.
CPC .. *B01D 2251/208* (2013.01); *B01D 2257/402* (2013.01); *B01D 2257/404* (2013.01); *B01D 2257/408* (2013.01); *B01D 2258/025* (2013.01)

(58) Field of Classification Search
CPC .... B01D 53/56; B01D 53/76; B01D 2221/00; B01D 2251/208; B01D 2257/402; B01D 2257/404; B01D 2257/408; B01D 2258/025
See application file for complete search history.

(56) References Cited

U.S. PATENT DOCUMENTS

| | | | |
|---|---|---|---|
| 7,648,673 | B2 | 1/2010 | Reiter et al. |
| 10,352,556 | B2 * | 7/2019 | Sedmak .................. F23C 3/002 |
| 2013/0277896 | A1 | 10/2013 | Buchet et al. |
| 2019/0119777 | A1 | 4/2019 | Borrel et al. |

FOREIGN PATENT DOCUMENTS

| | | | | |
|---|---|---|---|---|
| DE | 102010010197 A1 * | 9/2011 | .......... | B01J 20/3458 |
| DE | 102013010855 A1 * | 12/2014 | ............ | B01D 53/62 |
| EP | 2167695 B1 | 5/2017 | | |
| EP | 3 244 989 B1 * | 3/2020 | ............ | B01D 53/56 |
| JP | 02012101158 A * | 5/2012 | ............ | B01D 53/75 |
| WO | WO 2012 146 462 A * | 11/2012 | ............ | B01D 53/30 |
| WO | WO 2019011517 A1 * | 1/2019 | ............ | B01D 53/56 |

* cited by examiner

METHOD FOR REDUCING NITROGEN OXIDES IN STRIP TREATMENT FURNACES

BACKGROUND

The invention relates to a method for treating metal strip in a directly fired furnace through which the strip is guided. The furnace is fired directly by gas burners and has a non-fired zone ahead of the directly fired zone, when viewed in strip running direction, through which the exhaust gases from the fired zone flow and pre-heat the metal strip before it is heated further in the directly fired zone. After leaving the non-fired zone, the exhaust gases undergo post-combustion in an afterburner chamber.

A metal strip is often heat-treated in this way before galvanizing or also in annealing furnaces after a pickling line.

One heat treatment method is to use directly fired furnaces (DFF), where the burners are located directly inside the furnace.

With these furnaces, there is a pre-heating zone in which the metal strip running continuously through the furnace is pre-heated to approximately 200-300° C. with the aid of the hot exhaust gases from the directly fired furnace.

The burners of the directly fired furnaces are usually operated with gas (natural gas or coke oven gas). Nitrogen oxides ($NO_x$) contained in the exhaust gas are released during combustion. The term nitrogen oxide ($NO_x$) refers to the total nitrogen oxides forming during the combustion process. The most important of these compounds are usually NO and $NO_2$.

$NO_x$ can form directly from the combustion air either during conversion of the fuel or due to the high process temperatures.

The directives relating to nitrogen oxide emissions are becoming more and more stringent. Thanks to newly developed gas burners, the nitrogen oxide emissions from directly fired furnaces for strip treatment have been substantially reduced, in addition to other measures, however a further reduction would be more than welcome.

SUMMARY

The disclosed embodiments are thus based on the task of providing a low-cost method with which to further reduce the nitrogen oxide emissions.

In the disclosed method, methane ($CH_4$) is injected or blown into the non-fired zone, which causes nitrogen oxides ($NO_x$) contained in the exhaust gas to react with the methane. This reaction (reburning) results primarily in the formation of hydrogen cyanide (HCN). This area of the furnace largely contains no free oxygen.

Reburning of nitrogen oxides is known in other types of plants, such as coal-fired power stations or waste incineration plants, but the nitrogen oxide volume there is much more concentrated. For example, the 3000 mg/$Nm^3$ of nitrogen oxide in a 100 MW coal-fired power station is reduced to 500 mg/$Nm^3$ with appropriate reburning.

In a modern, directly fired furnace for treating metal strip, the current nitrogen oxide volume is only 120 mg/$Nm^3$, which is relatively low anyway. With the disclosed embodiments, this figure can be reduced further to 80 mg/$Nm^3$.

It is an advantage if air or oxygen is injected into the afterburner chamber, which degrades the hydrogen cyanide again that has formed.

Nitrogen is added to the methane preferably before it is injected into the non-fired zone. The methane can be blended into the exhaust gases more effectively by adding nitrogen. Methane and nitrogen can be blended and injected with the aid of Venturi nozzles. It is also possible to use a conventional burner for this task, replacing the combustion air with nitrogen oxide.

The ratio of methane to nitrogen can be in a range of 1:10.

The methane can be injected into the non-fired zone at several points at different distances from the nearest burner.

The non-fired zone may have nozzles through which nitrogen is blown in to cool the metal strip in the event of a fault, and methane is blown in through these nozzles to reduce the nitrogen content during normal operation.

BRIEF DESCRIPTION OF THE DRAWINGS

In the following, an embodiment of the invention is described on the basis of drawings. In these drawings.

DETAILED DESCRIPTION

Identical reference symbols in the individual figures refer to the same plant components in each case.

Figure 1:
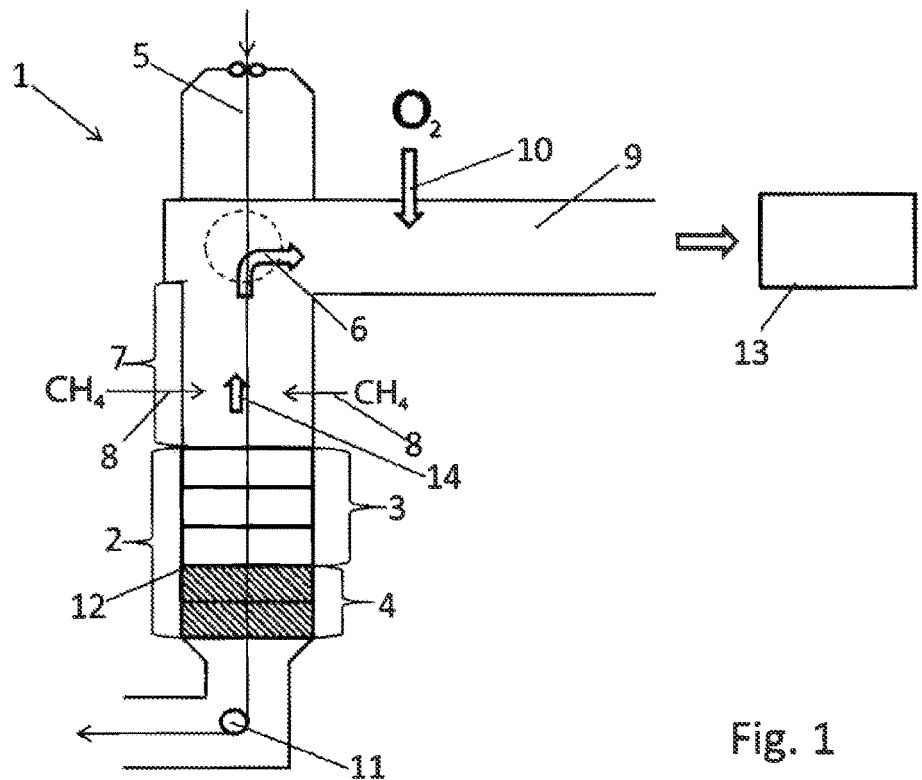
FIG. 1 shows a schematic view of a directly fired furnace for strip treatment.

FIG. 1 shows a part of a directly fired furnace 1 in which a metal strip 5 undergoes heat treatment. The metal strip 5 is guided from above into the inside of the furnace and passes first of all through the non-fired zone 7, which is several meters long and is the area where the metal strip 5 is pre-heated. The non-fired zone 7 here is the area before the fired zone 2, viewed in strip running direction, and in which there are no burners.

The metal strip 5 is heated up in the fired zone 2 of the furnace 1 with the aid of gas burners. Here, the metal strip 5 passes first of all through a zone 3 in which "nozzle mix" type burners are mounted in the furnace wall 12 and then through a zone 4 with "premix" type burners. At the lower end of the furnace 1, the metal strip 5 is deflected with the aid of the deflector roll 11 and then fed to a radiant tube furnace (RTF), for example.

The exhaust gas 14 forming in the zone 2 fired directly by the gas burners flows upwards in the furnace 1 and is deflected there into direction 6 and fed, in a way that is known, to an afterburner chamber 9 containing an afterburner for post-combustion of the exhaust gases 14. The metal strip 5 does not pass through the afterburner chamber 9. The exhaust gases 14 also contain nitrogen oxides, mainly NO and $NO_2$. In order to reduce this nitrogen oxide content, methane ($CH_4$) is injected through the feed pipes 8 or blown with the aid of nitrogen into the non-fired zone 7 of the furnace 1. The methane blends with the hot exhaust gases, and the nitrogen oxides react with the methane to form hydrogen cyanide.

The amounts of methane gas required can be relatively small here. A quantity of 5 $m^3$/h may be sufficient for a standard furnace 1. It is useful if this non-fired zone 7 is largely free of oxygen ($O_2$ content <0.05%) so that oxygen cannot react with the methane blown in. In order to guarantee that it remains oxygen-free, at least the burners nearest to it can be operated with excess fuel so that any oxygen present is burnt off beforehand.

In order to degrade the toxic hydrogen cyanide, oxygen ($O_2$) or air is blown into the afterburner chamber 9 through pipes 10, causing a reaction in the hydrogen cyanide to form nitrogen ($N_2$), carbon dioxide and hydrogen and/or steam. Finally, these exhaust gases are fed to a heat recovery plant 13 after they have been used once again for strip pre-heating.

Figure 2:
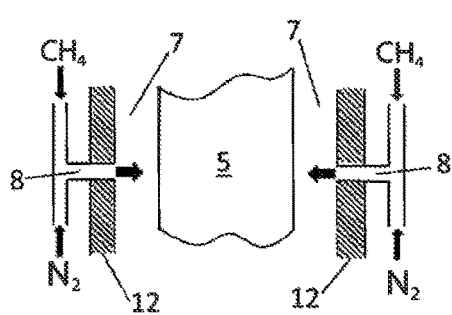
FIG. 2 contains a side view of the furnace area 7 into which the methane is injected.

FIG. 2 shows methane injection into the non-fired zone 7. It is shown here that the methane gas is mixed with nitrogen ($N_2$) before being injected and is blown onto both sides of the metal strip 5.

Figure 3:
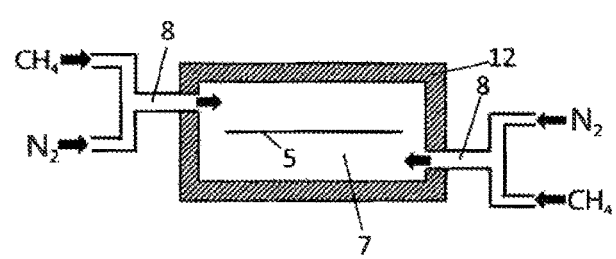
FIG. 3 shows a sectional view of the non-fired furnace area 7.

FIG. 3 shows a sectional view through this zone 7. Here, the methane gas is supplied in such a way that both the area around the front side of the metal strip as well as the area around the rear side of the metal strip are enriched with methane so that all of the exhaust gas 14 comes into contact with methane if possible. It is feasible to inject the methane at several points at different distances from the directly fired zone 2, for example at a distance of 1 m, 2 m, and 3 m from the nearest burner.

Methane gas injection can be retrofitted easily to existing plants to thus reduce nitrogen oxide emissions. With the present method, $NO_x$ values can be achieved in the region of 100 mg/$Nm^3$ or less.

Of course, the method according to the invention can also be used in horizontal or L-shaped, directly fired furnaces.

REFERENCE NUMERALS

1 Directly fired furnace
2 Fired zone
3 Nozzle mix
4 Premix
5 Metal strip
6 Direction
7 Non-fired zone
8 Methane injecting
9 Afterburner chamber
10 Oxygen injecting
11 Deflection roll
12 Furnace wall
13 Heat recovery plant
14 Exhaust gases from the burners

The invention claimed is:

1. A method for treating a metal strip (5) in a directly fired furnace (1), comprising the steps of:
   providing a furnace (1) having a non-fired zone (7) rear of a directly fired zone (2) that is fired by gas burners and an afterburner chamber (9) rear of the non-fired zone (7),
   running a guided metal strip (5) forward through the furnace from the non-fired zone (7) and directly-fired zone (2), wherein exhaust gases (14) generated in the fired zone (2) flow and pre-heat the metal strip (5) and then undergo post-combustion the afterburner chamber (9),
   adding nitrogen to methane to form a nitrogen-methane mixture; and
   injecting the nitrogen-methane mixture into the exhaust gas (14) in the non-fired zone (7), thereby converting nitrogen oxides present in the exhaust gas (14) to hydrogen cyanide.

2. The method according to claim 1, comprising injecting air or oxygen into the post-combustion chamber (9), thereby degrading the hydrogen cyanide.

3. The method according to claim 2, wherein the nitrogen-methane mixture is injected into the non-fired zone (7) at several different locations.

4. The method of claim 2, wherein the non-fired zone (7) has a plurality of nozzles (8), the nozzles (8) being configured to deliver nitrogen in the event of a fault condition to cool the metal strip (5) and deliver methane to reduce the nitrogen content during normal operation of the furnace (1).

5. The method of claim 2, wherein the ratio of methane to nitrogen in the mixture is approximately 1:10.

6. The method according claim 1, wherein the nitrogen-methane mixture is injected into the non-fired zone (7) at several different locations.

7. The method of claim 6, wherein the non-fired zone (7) has a plurality of nozzles (8), the nozzles (8) being configured to deliver nitrogen in the event of a fault condition to cool the metal strip (5) and deliver methane to reduce the nitrogen content during normal operation of the furnace (1).

8. The method of claim 6, wherein the ratio of methane to nitrogen in the mixture is approximately 1:10.

9. The method of claim 1, wherein the non-fired zone (7) has a plurality of nozzles (8), the nozzles (8) being configured to deliver nitrogen in the event of a fault condition to cool the metal strip (5) and deliver methane to reduce the nitrogen content during normal operation of the furnace (1).

10. The method of claim 9, wherein the ratio of methane to nitrogen in the mixture is approximately 1:10.

11. The method of claim 1, wherein the ratio of methane to nitrogen in the mixture is approximately 1:10.

12. The method of claim 1, comprising the step of providing oxygen to the afterburner chamber (9), thereby converting hydrogen cyanide present in the afterburner chamber (9) to nitrogen, carbon dioxide and one or both of hydrogen and steam.

13. A method for treating a metal strip (5) in a directly fired furnace (1), comprising the steps of:
   providing a furnace (1) having a non-fired zone (7) rear of a directly fired zone (2) that is fired by gas burners and an afterburner chamber (9) rear of the non-fired zone (7);
   running a guided metal strip (5) forward through the furnace from the non-fired zone (7) and directly-fired zone (2), wherein exhaust gases (14) generated in the fired zone (2) flow and pre-heat the metal strip (5) and then undergo post-combustion the afterburner chamber (9);
   mixing methane and nitrogen to form a nitrogen-methane mixture; and
   injecting the nitrogen-methane mixture into the exhaust gas (14) in the non-fired zone (7), thereby converting nitrogen oxides present in the exhaust gas (14) to hydrogen cyanide.

14. The method of claim 13, comprising the step of providing oxygen to the afterburner chamber (9), thereby converting hydrogen cyanide present in the afterburner chamber (9) to nitrogen, carbon dioxide and one or both of hydrogen and steam.

15. The method according to claim 13, wherein the nitrogen-methane mixture is injected into the non-fired zone (7) at several different locations.

16. The method according to claim 13, comprising injecting air or oxygen into the post-combustion chamber (9), thereby degrading the hydrogen cyanide.

17. A method for treating a metal strip (5) in a directly fired furnace (1), comprising the steps of:
   providing a furnace (1) having a non-fired zone (7) rear of a directly fired zone (2) that is fired by gas burners and an afterburner chamber (9) rear of the non-fired zone (7),
   running a guided metal strip (5) forward through the furnace from the non-fired zone (7) and directly-fired zone (2), wherein exhaust gases (14) generated in the fired zone (2) flow and pre-heat the metal strip (5) and then undergo post-combustion the afterburner chamber (9), and injecting methane into the exhaust gas (14) in the non-fired zone (7), thereby converting nitrogen oxides present in the exhaust gas (14) to hydrogen cyanide, wherein the non-fired zone (7) has a plurality of nozzles (8), the nozzles (8) being configured to deliver nitrogen in the event of a fault condition to cool the metal strip (5) and deliver methane to reduce the nitrogen content during normal operation of the furnace (1).

18. The method according to claim 17, comprising injecting air or oxygen into the post-combustion chamber (9), thereby degrading the hydrogen cyanide.

19. The method according to claim 17, wherein the methane is injected into the non-fired zone (7) at several different locations.

\* \* \* \* \*